(12) United States Patent
Keener et al.

(10) Patent No.: US 7,465,234 B2
(45) Date of Patent: Dec. 16, 2008

(54) HYBRID FASTENING SYSTEM AND ASSOCIATED METHOD OF FASTENING

(75) Inventors: Steven G. Keener, Trabuco Canyon, CA (US); Cesare Peralta, Corona, CA (US)

(73) Assignee: The Boeing Company, Chicago, IL (US)

( * ) Notice: Subject to any disclaimer, the term of this patent is extended or adjusted under 35 U.S.C. 154(b) by 528 days.

(21) Appl. No.: 10/939,835

(22) Filed: Sep. 13, 2004

(65) Prior Publication Data

US 2006/0057413 A1    Mar. 16, 2006

(51) Int. Cl.
*B21G 5/00* (2006.01)
(52) U.S. Cl. ............... 470/6; 470/2; 470/17; 470/32; 148/670; 72/46
(58) Field of Classification Search .............. 470/2, 470/3, 5, 6, 7, 25, 27, 31, 32, 38, 17; 411/361; 148/669, 670, 671; 72/46
See application file for complete search history.

(56) References Cited

U.S. PATENT DOCUMENTS

| | | | |
|---|---|---|---|
| 3,953,906 A * | 5/1976 | Brown ..................... 470/28 |
| 4,635,310 A * | 1/1987 | Kendall .................... 470/11 |
| 4,659,268 A | 4/1987 | Del Mundo et al. |
| 4,717,302 A | 1/1988 | Adams et al. |
| 4,768,910 A * | 9/1988 | Rath ....................... 411/361 |
| 4,778,637 A | 10/1988 | Adams et al. |
| 4,861,211 A | 8/1989 | Dunsmore |
| 5,083,888 A | 1/1992 | Gapp et al. |
| 5,145,300 A | 9/1992 | Wallace et al. |
| 5,614,037 A | 3/1997 | Keener |
| 5,788,441 A * | 8/1998 | Karabestos et al. ...... 411/366.3 |
| 5,858,133 A | 1/1999 | Keener |
| 5,922,472 A | 7/1999 | Keener |
| 5,944,918 A | 8/1999 | Keener |
| 6,171,649 B1 | 1/2001 | Keener et al. |
| 6,221,177 B1 | 4/2001 | Keener |
| 6,274,200 B1 | 8/2001 | Keener et al. |
| 6,403,230 B1 | 6/2002 | Keener |
| 6,494,972 B1 | 12/2002 | Keener et al. |
| 6,499,926 B2 | 12/2002 | Keener |
| 6,638,381 B2 | 10/2003 | Keener et al. |
| 6,953,509 B2 * | 10/2005 | Keener ..................... 148/537 |
| 7,128,949 B2 * | 10/2006 | Keener et al. ............ 427/385.5 |
| 7,195,438 B2 * | 3/2007 | Harbin et al. .............. 411/361 |
| 2003/0111147 A1 * | 6/2003 | Keener et al. ............... 148/671 |

OTHER PUBLICATIONS

Search Report for PCT/US2005/032578 dated Feb. 2, 2006.

* cited by examiner

*Primary Examiner*—Edward Tolan
(74) *Attorney, Agent, or Firm*—Alston & Bird LLP

(57) ABSTRACT

A hybrid fastening system comprising a female fastener component, i.e., swage collar, fabricated from a titanium or titanium-alloy material, preferably Ti-3Al-2.5V, and a mating titanium or titanium-alloy material male fastener component, i.e., threaded pin, each preferably pre-coated with an organic coating material comprising an organic, phenolic resin. The threaded pin component is installed through two or more structural components to be joined. The swage collar component is then deformed or swaged onto the threads of the pre-coated threaded pin component to achieve the same, if not improved, fastener/joint performance characteristics of existing lockbolt systems using aluminum-alloy material swage collar components.

22 Claims, 2 Drawing Sheets

HYBRID FASTENING SYSTEM AND ASSOCIATED METHOD OF FASTENING

BACKGROUND OF THE INVENTION

This invention relates to the preparation of high-strength titanium or titanium-alloy material fasteners. More particularly, the present invention relates to the preparation of high-strength titanium or titanium-alloy material fasteners for use in hybrid fastening systems. The invention further relates to the use of organic, corrosion-inhibiting coatings to pre-coat the high-strength titanium or titanium-alloy material hybrid fastener components.

Various two-piece metallic aerospace fastening systems have long been used for the joining and assembly of aircraft structures and components. Specifically, two primary systems are widely employed in the installation of male and female fastener components. The first system utilizes male threaded pins, which may be installed with female mating components, i.e., either threaded collars or nuts. The second system employs male lockbolts that may be installed with swaged cylindrical collars. Both fastening systems and assembly approaches can be, and have been, automated to various levels over the years. However, the use of such two-piece mechanical fastening systems has several inherent drawbacks, each in their own separate ways.

For example, with the threaded pin fastening system approach, the drawback issue or limitation has been in achieving the fastener assembly/joint integrity and associated strength allowables, which directly result from the application of adequate and proper torque during installations, while not incurring additional expenses associated with the time associated with installing the female threaded nut/collar components. The strength issue can and has been reconciled by the use of stainless or alloy-steel or titanium-alloy material female threaded nut/collar components, which however are heavier though than the female aluminum-alloy material swaged collar components, but the clamp-up/re-torquing issues surrounding the installation of the threaded nut/collar components still can pose cost challenges. Not to mention the problems associated with re-torquing requirements brought on by the use of wet faying-surface sealants. This re-torquing process step has been automated to a certain degree with electrical nut-runners, whether machine-based or manual, but can lack in the ability to achieve adequate clamp-up if not performed in a fully automated assembly machine.

Likewise, the drawback issues or limitations associated with the installation and assembly of traditional pull-type or stump-type lockbolt fastening system approaches deal with the continual challenges of achieving adequate and proper swaging or compaction of the female aluminum-alloy material collar components onto the concentric grooves of the male stump-type or pull-type lockbolt components. Further, rework with the general lockbolt approach can be somewhat expensive, requiring the subsequent cutting and removal of any unacceptably swaged collar component installations. With this rework procedure, once the swaged collar components are successfully removed, the problem of re-swaging replacement female collar components remains since their installations require an extremely large swaging force and repositioning of not only the wing panel assembly in the automation equipment, but possibly the re-installation and repositioning of the specific fastener installation as well.

It is desired to provide a fastening system that combines the advantages of the two systems discussed above, but which avoids the disadvantages associated with either the proper swaging and re-swaging of aluminum-alloy collar components or proper torquing of threaded nut/collar components.

SUMMARY OF THE INVENTION

The invention is a hybrid fastening system that combines the advantageous benefits of a female swage collar component from a traditional lockbolt fastening system with the complimentary features of a male threaded pin component from a traditional threaded pin fastener system while optionably utilizing the propitious characteristics of pre-coating technology.

According to the invention, a female fastener component, i.e., swage cylindrical collar, fabricated from a titanium or titanium-alloy material, preferably Ti-3A1-2.5V, is provided. A mating titanium or titanium-alloy material male fastener component, i.e., threaded pin is also provided. According to a method of utilizing the invention, the male threaded pin component is installed through two or more components or articles to be joined and assembled. The female swage collar component is then swaged onto the threads of the male threaded pin component to achieve the same, if not improved, fastener/joint performance characteristics of previous titanium or aluminum-alloy collars used in conjunction with the traditional lockbolt systems.

The titanium-alloy material threaded pin male fastener component is produced according to techniques known in the art. The female titanium-alloy material swage collar fastener component may be produced according to a number of methods of producing high-strength titanium or titanium-alloy material articles or components. One such method is disclosed in U.S. Pat. No. 6,638,381, which teaches a method for preparing ultra-fine grain titanium or titanium-alloy material articles. According to that method, coarse-grained titanium or titanium-alloy materials are processed through a friction stir processing tooling device containing a stirring chamber and a stirring tool. As the material is passed through the stirring chamber, the stirring tool solutionizes the titanium or titanium-alloy material and stirs the material to obtain a homogeneous or uniform microstructure condition. As the processed material exits the stirring chamber of the friction stir process tooling device, it reconsolidates as an extremely homogeneous structure possessing ultra-fine grain microstructure. The high-performance titanium or titanium-alloy material is then subsequently processed via extrusion, drawing, forging, machining, etc. into the form of a female swage collar fastener component. Though many types of titanium or titanium-alloy materials may be used in accordance with the invention, Ti-3A1-2.5V titanium-alloy material is the preferred titanium-alloy material for the female swage collar component. The Ti-3A1-2.5V titanium-alloy material provides a favorable balance of strength and ductility such that the female swage collar component may be subsequently swaged onto the threaded portion of the male threaded pin component using commonly known swaging devices and processes, producing an installed, swaged collar that has greater resistance to shear and tensile forces than a comparable aluminum-alloy material collar.

According to an alternative embodiment, both the female swage collar component and the male threaded pin component are pre-coated with a cured, corrosion-inhibiting organic coating. The application of the corrosion-inhibiting organic coating does not adversely affect the properties of the fastener component or article. The present approach is a very economical alternative to other commonly employed corrosion prevention techniques used in fastener installation procedures and, in one embodiment, may be accomplished at an additional minimal cost of much less than one cent per fastener component to achieve above the cost for its alternatively, unprotected condition, which provides inferior corrosion protection.

To pre-coat the threaded pin and swage collar components, a curable organic coating material is provided. The coating material has a non-volatile portion that is predominantly organic and curable for predetermined periods of time at about room temperature or slightly elevated temperatures. A preferred curing temperature is about 400° F. for approximately 1 hour to 1½ hours. The organic coating material is applied to the threaded pin and collar components by any suitable approach and subsequently cured. The particular organic coating and/or cure temperature protocols may be the same and/or different for the threaded pin and collar components.

According to another alternative embodiment, the threaded pin and/or the collar components may be provided in an annealed or quenched condition suitable for the subsequent utilization of the strengthening heat-treatment, but not as yet heat-treated. The organic coating material, preferably dissolved in a suitable carrier liquid, may be applied to either or both of the threaded pin/collar components, which are not in their heat-treated states. The carrier liquid is removed by an appropriate evaporation process, and the component is thereafter heat-treated to its full strength by heating to appropriate curing time/temperature protocols. During the heat-treatment according to the combination of temperature, time, and environment specified for the titanium-alloy base material metal of the fastener component, the coating is simultaneously cured. Thus, no separate curing procedure is required for the coating after the article is heat-treated.

According to still another alternative embodiment of the invention, the hybrid fastening system is used to join and fasten structural components of an aerospace structure, including but not limited to the wing skin panels, fuselage skin panels, control surfaces, and all structural assemblies of an aircraft that employ mechanical fastening techniques. Almost all joints of an aerospace structure, particularly those that have previously been joined using the traditional lockbolt or threaded pin systems may be joined and fastened with the invented hybrid fastening system. The invention also encompasses structures fastened in such a manner.

This hybrid fastening system is comprised of metallic components from two previously existing, similar but, until now, separate fastening systems. The hybrid fastening system allows for fastener assembly at increased rates with an increased level of automation, and the system may be utilized for a wide variety of structural applications in efficient and effective assembly processes.

Among other advantages described herein, the invented hybrid fastening system reduces or alleviates many technical problems associated with previous or existing fastening systems. For instance, the combination of female swage collar and male threaded pin mating components eliminates the subsequent and expensive steps of manual or automated installation of threaded nuts, and reduces costs associated with the removal and rework procedures utilized in the disposition of unacceptable installations, i.e. female swaged collars can be removed relatively easily from the male threaded pin components, using threaded nut components as replacement hardware.

The use of the pre-coating process in conjunction with the hybrid fastening system allows for improved material flow of the female titanium or titanium-alloy material collar components during the swaging process afforded by the lubricity of the coating applied in the pre-coating process, which also provides for equivalent or improved joint integrity and strength. The pre-coating process further provides additional benefits in sealing and corrosion protection for both threaded pin and swage collar components. The use of wet sealants eliminated by the pre-coating process also allows for improved workmanship in the fastener installation, as there is no possibility of not coating any of the fasteners, which has been the case when wet sealant is applied in the past. The pre-coated fastener components are more resistant to corrosion during service than are uncoated fasteners even when installed using the wet-sealant procedure.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Figure 1:
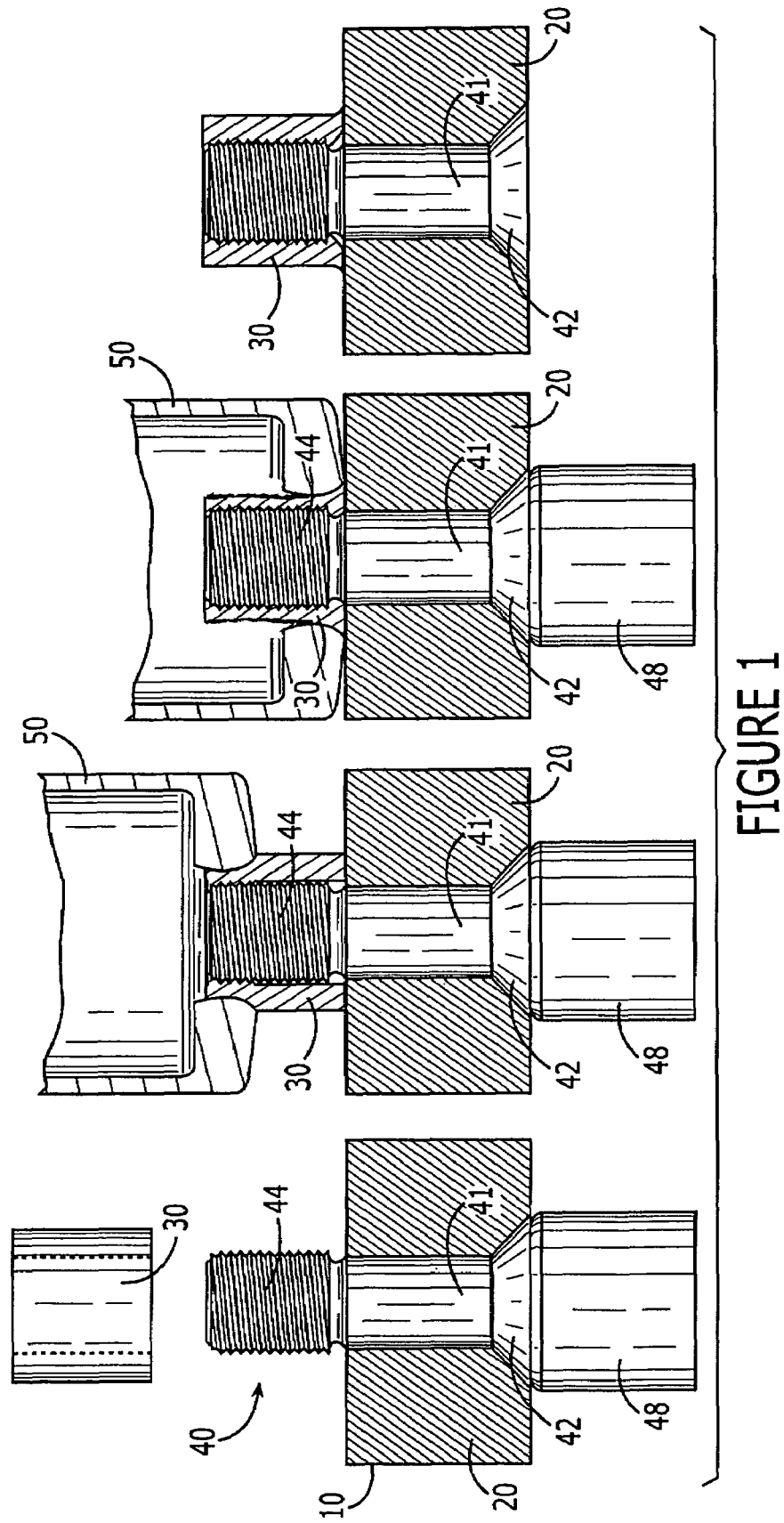
Figure 2:
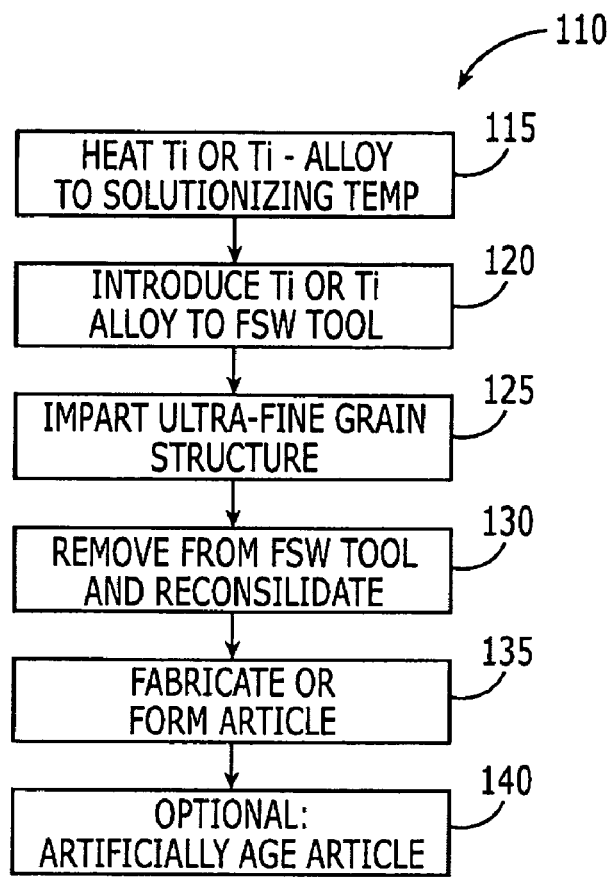
Figure 3:
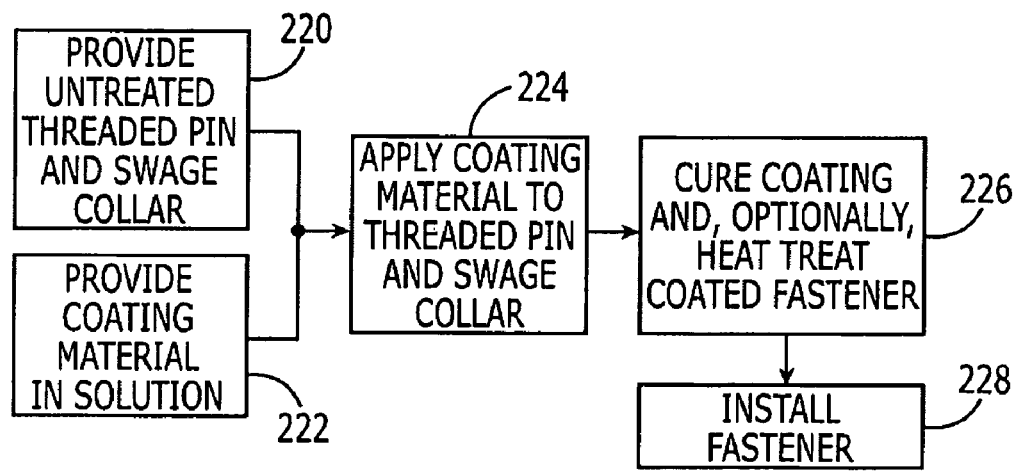

Having thus described the invention in general terms, reference will now be made to the accompanying drawings, which are not necessarily drawn to scale, and wherein:

FIG. 1 illustrates the invented hybrid fastening system and installation of the invented hybrid fastening system in accordance with one embodiment;

FIG. 2 is logic flow diagram for producing an ultra-fine grain titanium or titanium-alloy material article from a titanium-alloy raw material feed source; and, FIG. 3 is a process flow diagram for the pre-coating method of one embodiment of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 illustrates the invented hybrid fastening system that comprises a titanium-alloy material swage collar component 30 and mating threaded pin component 40. The threaded pin component 40 may be of any shape commonly known in the art of fastening systems, such as those used in the aerospace industry. Typically, threaded pin components have a cylindrical main body 41 having a flat or rounded head 42 on one end and threads 44 on the opposing end. The threads 44 of the threaded pin component 40 are generally helical threads as known in the art of aerospace fasteners, and are contrasted with the generally concentric ridges or grooves typically found on lockbolt-style male fastener components.

The swage collar component 30 is a cylindrical thick-walled tube or sheath having an internal diameter roughly equivalent to or slightly greater than the outer diameter of the threads of the corresponding threaded pin component 40. Both the swage collar component 30 and threaded pin component 40 are formed of a titanium or titanium-alloy material.

To install the hybrid fastening system, the threaded pin component 40 is inserted through a hole, which extends through two or more structural components to be joined and assembled 10, 20. As shown in steps 1 and 2 of FIG. 1, the threaded pin component 40 is inserted and subsequently held in position by a lower tooling anvil 48 while a female swage collar mating component 30 is positioned and installed over the threads 44 of the threaded pin component 40. By "mating", it is meant that the swage collar component 30 has an internal diameter equivalent to or, preferably, slightly larger than the outer diameter of the threads 44 of the threaded pin component such that the swage collar component 30 may be readily installed over the threads of the threaded pin component 40, and such that deformation of the swage collar component 30 radially inward toward its centerline would cause the internal surface of the swage collar component 30 to intimately contact and flow into the helix of the threads 44 of the threaded pin component 40.

An upper swaging anvil tool 50 is forcibly applied to the swage collar component 30 so as to deform the swage collar component 30 radially inwardly, and slightly lengthwise, thereby causing the internal surface of the swage collar component 30 to intimately contact and flow into the helix of the threads 44 of the threaded pin component 40. Referring to step 4, the lower tooling anvil 48 is removed after the swaging operation is complete. The completed installation results in the threaded pin component 40 being held in place by the deformed swaged collar component 30, which securely fastens structural components 10 and 20.

Referring to FIG. 2, according to one embodiment as further described in U.S. Pat. No. 6,638,381, the titanium or titanium-alloy material has an ultra-fine grain metallurgical microstructure, i.e. grain size less than about 10,000 nm, and preferably less than about 300 nm, such as from 100 nm to 300 nm, produced by heating a coarse-grain titanium or titanium-alloy raw material feed source to approximately a solutioning treatment temperature that is below its respective melting temperature, step 115. Next, in Step 120, the heated titanium or titanium-alloy raw material is then introduced into a friction stir processing tooling device.

In Step 125, the heated titanium or titanium-alloy raw material feed stock is stirred as it is fed through the friction stir tooling device to fully homogenize the raw feed stock material and to impart an ultra-fine grain microstructure. The friction stir process raises the temperature of the raw material feed stock to a solutionizing treatment temperature. The stirring rate and length of time within the tooling device is dependent upon the type and amount of material introduced to the device, the temperature of the heated titanium or titanium-alloy material within the device, and the size of the chamber used for mixing the titanium-alloy material.

In Step 130, the homogenized raw material feed stock is removed from or exits the tooling device as reconsolidated titanium or titanium-alloy material having a microstructure possessing ultra-fine grain particle size. In Step 135, the titanium or titanium-alloy material is then subjected to normal manufacturing steps associated with typical aerospace articles or components, such as fasteners, including but not limited to cold-working and cold-forming, but not requiring further thermal or heat-treatment steps. Optionally, in Step 140, the formed components may be subjected to an artificially-aging thermal treatment for pre-determined times and temperatures. For commercially pure (CP) titanium material, the titanium material is kept in the oven for approximately 12 hours at between approximately 900° and 950° Fahrenheit. The articles or components are then available for use.

The titanium or titanium-alloy material of the swage collar and threaded pin components may be any titanium or titanium-alloy material as is well known in the art. As used herein, the term "titanium-alloy" includes varieties of pure titanium and substantially pure titanium-alloy base materials. Exemplary binary titanium-alloy materials include β-Ti—Mo and α-Ti—Al. Commercially pure, Ti-6Al-4V, and Ti-5Al-2.5Sn titanium-alloy materials are also preferred. For the swage collar component, the Ti-3Al-2.5V titanium-alloy material is particularly preferred as it provides a favorable balance of strength and ductility such that the swage collar component may be deformed or swaged onto the threads of the threaded pin component using common swaging tool devices and equipment such that the resulting swage collar and threaded pin assembly has greater resistance to shear and tensile forces than the comparable swaged aluminum-alloy material collar and threaded pin assembly.

Both the threaded pin and swage collar components may be pre-coated with the same or different curable organic coatings prior to installation and assembly. According to one pre-coating method as depicted in FIG. 3, the threaded pin and swage collar components are provided, step 120. The threaded pin and swage collar components may be previously heat treated or may be provided in an untreated state.

A curable organic coating material is provided, step 222, preferably in solution so that it may be readily and evenly applied. A primary function of the coating material is to protect the base metal to which it is applied from corrosion, including, for example, conventional environmental corrosion, galvanic corrosion, and stress corrosion. The coating material is a formulation that is primarily of an organic composition, but which may contain additives to improve any number of its properties. It is desirably initially dissolved in a carrier liquid so that it can be easily applied to a substrate. In the preferred approach, the coating is sprayed onto the component. After application, the coating material is curable to effect structural changes within the organic component, typically cross-linking of organic molecules to improve the adhesion and cohesion of the coating.

A wide variety of curable organic coating materials are available. A typical and preferred curable organic coating material has phenolic resin mixed with one or more plasticizers, other organic components such as polytetrafluoroethylene, and inorganic additives such as aluminum powder and/or strontium chromate. These coating components are preferably dissolved in a suitable solvent present in an amount to produce a desired application consistency. For the coating material just discussed, the solvent is preferably a mixture of ethanol, toluene, and methyl ethyl ketone. A typical sprayable coating solution has about 30 weight percent ethanol, about 7 weight percent toluene, and about 45 weight percent methyl ethyl ketone as the solvent; and about 2 weight percent strontium chromate, about 2 weight percent aluminum powder, with the balance being phenolic resin and plasticizer as the coating material. A small amount of polytetrafluoroethylene may optionally be added. Such a product is available commercially as Hi-Kote 1™ coating from The Hi-Shear Corporation, Torrance, Calif. It has an elevated temperature curing treatment of from about 1 hour to 4 hours at between approximately 350° and 400° F., as recommended by the manufacturer, preferably, from about 1 hour to 1½ hours at approximately 400° F.

The coating material is applied to the untreated swage collar and threaded pin components, step 224. Any suitable approach, such as dipping, spraying, or brushing, can be used. In the preferred approach, the solution of coating material dissolved in solvent is sprayed onto the untreated components. The majority of solvent is removed from the as-applied coating material by drying, either at ambient or slightly elevated temperature, for a relatively short period of time, so that the coated article or component is dry to the touch for handling purposes. The coated article or component is however not suitable for service at this point, because the coating is not sufficiently adherent to the alloy base metal and because the coating itself is not sufficiently coherent to resist mechanical damage that may occur in service.

The coating is subsequently and properly cured 226 at elevated temperature for a period of time. If the swage collar or threaded pin component requires heat treatment prior to use, it may be heated to a desired elevated temperature for a suitable amount of time simultaneously to achieve heat treatment to the component's final desired strength as well as to facilitate the adequate cure of the coating. This thermal treatment may not produce the most optimal cure state for the coating, but it has been determined that the heat treatment of the metallic substrate is less forgiving of slight variations from the optimal treatment than is the curing treatment of the organic coating. That is, the curing of the coating can sustain larger, more excessive variations in time and temperature with acceptable results than can the heat treatment of the component's metallic substrate. Thus, the use of the heat treatment of the component yields the optimal physical properties of the metallic substrate, and acceptable properties of the coating material. The coating material 48 is typically about 0.0003-0.0005 inch in thickness after curing 226.

The coated components are ready for installation, step 228. The hybrid fastener system is then installed. The coating is retained on the male threaded pin and female swage collar components even after the swage collar component has been deformed and swaged. The installation step reflects two of the numerous advantages of the present invention. First, improved material flow of the swage collar component into the threads at the threaded pin component is achieved due to the coating material's lubricity, which reduces surface friction allowing relative flow of material to occur. Second, if the coating is not applied to the fastener components, it is typically necessary to place a viscous wet-sealant material into the drilled holes and onto the male fastener component as it is installed, to coat the surrounding, mating surfaces. The wet-sealant material is messy and difficult to work with, and necessitates extensive clean-up of tools and the surrounding, exposed surfaces of the work components with caustic chemical solutions after installation of the fasteners. Moreover, it has been observed that the presence of residual wet sealant inhibits the adhesion of later-applied paint and topcoats over the fastener heads.

The present coating approach therefore overcomes the following problems of the existing fastener systems. Improved swage collar conditions result. Wet sealant is not needed or used during installation. Improved adherence of any later-applied paint and topcoat over the pre-coated fastener heads.

EXAMPLES

Two sheets of 2024-T3 clad aluminum-alloy material having an e/D=2.0 were tested in conjunction with two 3/16-inch diameter threaded pins having a minimum shear strength of 95 ksi in accordance with NASM 1314-4 static lap shear strength test procedure in order to determine the shear strength of the titanium-alloy threaded pins.

The test specimens were assembled by G-1700 Drivmatic™ automated assembly equipment. All installed swage collars were inspected with go-no-go profile gages developed by the fastener supplier. The male fastener components were 3/16-inch diameter, pre-coated Ti6Al4V titanium-alloy material, flush tension head threaded pin fasteners assembled with female pre-coated Ti3A1-2.5V titanium-alloy material swage collar components. The fastener holes were drilled with 100° flush crown tension head configurations. The fasteners were installed in interference-fit holes having diameters in the range of 0.1850 inch to 0.1880 inch. Upset forces were approximately 1900 lbs to 2200 lbs.

The test equipment was an Instron test machine, Model No. 4505, using a loading rate of 0.05 inch per minute. The accuracy of the test machine conformed to the requirements of ASTM E 4. Test specimens were installed in the clevis grips of the test machine. Test grips were tightened and a token load of 10% maximum of the anticipated yield load was applied. The 2-inch extensiometer, Instron Model No. 2630-005, was attached and the load was applied to the test specimen while obtaining a load-deflection plot or curve. A secondary modulus loop was developed by dropping the load on the test specimen to approximately 10% to 20% of the anticipated yield load and then re-applying the load to produce a hysteresis loop. For each specimen, the load versus deflection was autographically recorded with ultimate load values at failure being recorded. These ultimate load values are presented in Table 1. The type of failure was a combination of sheet tearing and fastener pull-through.

TABLE 1

| Test Specimen ID No. | Nominal Individual Sheet Thickness, inch | Ultimate Shear Strength, lbs | Average Ultimate Shear Strength, lbs | Design Ultimate Shear Strength, lbs |
|---|---|---|---|---|
| LS3-1 | 0.125 | 2752.5 | 2634.5 | 1982.0 |
| LS3-2 |  | 2602.5 | (+33%) |  |
| LS3-3 |  | 2635.0 |  |  |
| LS3-4 |  | 2565.0 |  |  |
| LS3-5 |  | 2500.0 |  |  |
| LS3-6 |  | 2635.0 |  |  |
| LS3-7 |  | 2665.0 |  |  |
| LS3-8 |  | 2715.0 |  |  |
| LS3-9 |  | 2590.0 |  |  |
| LS3-10 |  | 2685.0 |  |  |
| LS4-1 | 0.160 | 3590.0 | 3583.0 | 2471.0 |
| LS4-2 |  | 3540.0 | (+45%) |  |
| LS4-3 |  | 3645.0 |  |  |
| LS4-4 |  | 3545.0 |  |  |
| LS4-5 |  | 3620.0 |  |  |
| LS4-6 |  | 3557.2 |  |  |
| LS4-7 |  | 3645.0 |  |  |
| LS4-8 |  | 3620.0 |  |  |
| LS4-9 |  | 3490.0 |  |  |
| LS4-10 |  | 3572.5 |  |  |

The actual ultimate shear strengths for joints employing the new hybrid fastening system ranges from +33% to +45% higher than a variety of 6A1-4V titanium-alloy 100° flush tension head fastener types, such as threaded pins using threaded nuts, e.g., alloy-steel or titanium lockbolts, pull-type or stump-type, using aluminum-alloy swage collars.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for preparing a titanium-alloy material hybrid fastening system, comprising the steps of:
   forming a titanium or titanium-alloy material threaded pin component;
   forming a mating titanium or titanium-alloy material swage collar component, wherein at least one of the threaded pin component and the swage collar component is formed of an ultra-fine grain titanium material or an ultra-fine grain titanium-alloy material;

applying a corrosion-resistant, curable organic coating material to a titanium or titanium-alloy material threaded pin component and to a titanium or titanium-alloy material swage collar component having internal dimensions approximating the dimension of and conformable to the threads of the threaded pin component wherein the coating material comprising a phenolic resin and an organic solvent; and curing the coating material after application to the threaded pin and swage collar components, wherein at least one of the threaded pin component or the swage collar component is not fully heat-treated prior to coating and is subsequently heat-treated concurrently with the curing of the coating material.

2. The method of claim 1, wherein the threaded pin and swage collar components are formed from the same ultra-fine grain titanium material or ultra-fine grain titanium-alloy material.

3. The method of claim 1, wherein the threaded pin and swage collar components are formed from different ultra-fine grain titanium materials or ultra-fine grain titanium-alloy materials.

4. The method of claim 1, wherein the step of applying the organic coatings includes the step of spraying the respective organic coating materials onto the respective components, and thereafter removing any volatile constituents from the respective sprayed coatings.

5. The method of claim 1, further comprising the step of fastening a first component to a second component following curing of the organic coatings by installing the threaded pin component through the components and installing the swage collar component to the threads of the threaded pin component.

6. The method of claim 5, wherein the first and second components are structural components of an aerospace structure.

7. The method of claim 5, wherein the step of fastening includes the step of completing the fastening without using any wet sealant between the threaded pin component, swage collar component, and the structural components.

8. The method of claim 1, wherein the coating material applied to the threaded pin component has the same composition as the coating material applied to the swage collar component.

9. The method of claim 1, wherein the coating material applied to the threaded pin component has a different composition as the coating material applied to the swage collar component.

10. The method of claim 1, wherein the coating material applied to the threaded pin component and the coating material applied to the swage collar component are cured simultaneously.

11. The method of claim 1, wherein the coating material applied to the threaded pin component and the coating material applied to the swage collar component are not cured simultaneously.

12. A hybrid fastening system prepared in accordance with the method of claim 1.

13. An aerospace structure prepared in accordance with the method of claim 6.

14. A method for preparing a titanium-alloy material hybrid fastening system, comprising the steps of:

forming a titanium or titanium-alloy material threaded pin component, and forming a mating titanium or titanium-alloy material swage collar component, wherein at least one of the threaded pin component and the swage collar component is formed of an ultra-fine grain titanium material or an ultra-fine grain titanium-alloy material;

applying a corrosion-resistant, curable organic coating material to a titanium or titanium-alloy material threaded pin component and to a titanium or titanium-alloy material swage collar component having internal dimensions approximating the dimension of and conformable to the threads of the threaded pin component wherein the coating material comprising a phenolic resin and an organic solvent;

curing the coating material after application to the threaded pin and swage collar components, wherein the threaded pin component and the swage collar component are not fully heat-treated prior to coating and are subsequently heat-treated concurrently with the curing of the coating material; and fastening a first component to a second component following curing of the organic coatings by installing the threaded pin component through the components and installing the swage collar component to the threads of the threaded pin component, wherein the step of fastening includes the step of completing the fastening without using any wet sealant between the threaded pin component, swage collar component, and the structural components.

15. The method of claim 14, wherein the threaded pin and swage collar components are formed from the same ultra-fine grain titanium material or ultra-fine grain titanium-alloy material.

16. The method of claim 14, wherein the threaded pin and swage collar components are formed from different ultra-fine grain titanium materials or ultra-fine grain titanium-alloy materials.

17. The method of claim 14, wherein the first and second components are structural components of an aerospace structure.

18. The method of claim 14, wherein the coating material applied to the threaded pin component has the same composition as the coating material applied to the swage collar component.

19. The method of claim 14, wherein the coating material applied to the threaded pin component has a different composition as the coating material applied to the swage collar component.

20. The method of claim 14, wherein the coating material applied to the threaded pin component and the coating material applied to the swage collar component are cured simultaneously.

21. The method of claim 14, wherein the coating material applied to the threaded pin component and the coating material applied to the swage collar component are not cured simultaneously.

22. An aerospace structure prepared in accordance with the method of claim 17.

* * * * *